(No Model.) 9 Sheets—Sheet 1.

C. B. ADAMS.
PRESS.

No. 298,931. Patented May 20, 1884.

WITNESSES
Henry C. Hazard
Jas. E. Hutchinson

INVENTOR
Chas. B. Adams, by
Prindle and Russell, his
Attorneys.

(No Model.)

9 Sheets—Sheet 3.

C. B. ADAMS.
PRESS.

No. 298,931.      Patented May 20, 1884.

WITNESSES
Henry C. Hazard
Jas. E. Hutchinson

INVENTOR
Chas. B. Adams, by
Prindle & Russell, his
Attorneys.

(No Model.)

9 Sheets—Sheet 4.

C. B. ADAMS.
PRESS.

No. 298,931. Patented May 20, 1884.

WITNESSES
Henry C. Hazard
Jas. C. Hutchinson

INVENTOR
Chas. B. Adams, by
Prindle & Russell, his
Attorneys.

(No Model.) 9 Sheets—Sheet 6.

C. B. ADAMS.
PRESS.

No. 298,931. Patented May 20, 1884.

WITNESSES INVENTOR (No Model.) 9 Sheets—Sheet 8.

C. B. ADAMS.
PRESS.

No. 298,931. Patented May 20, 1884.

WITNESSES
Henry C. Hazard.
Jas. E. Hutchinson.

INVENTOR
Chas. B. Adams, by
Prindle & Russell, his
Attorneys.

(No Model.) 9 Sheets—Sheet 9.
C. B. ADAMS.
PRESS.
No. 298,931. Patented May 20, 1884.
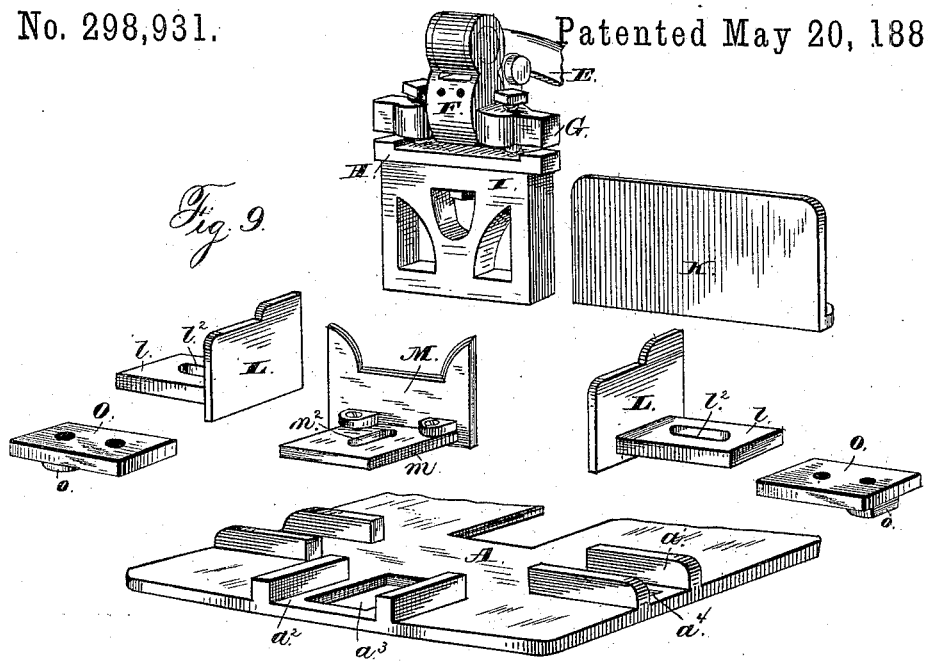
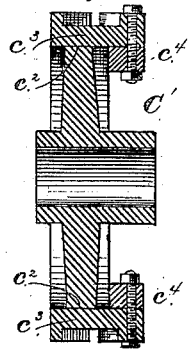
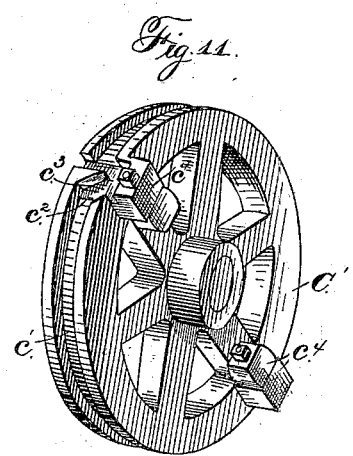
WITNESSES
Henry C. Hazard
Jas. E. Hutchinson
INVENTOR
Chas. B. Adams, by
Grindle & Russell, his
Attorneys.

UNITED STATES PATENT OFFICE.

CHARLES B. ADAMS, OF QUINCY, ILLINOIS.

PRESS.

SPECIFICATION forming part of Letters Patent No. 298,931, dated May 20, 1884.

Application filed March 28, 1884. (No model.)

*To all whom it may concern:*

Be it known that I, CHARLES B. ADAMS, of Quincy, in the county of Adams, and in the State of Illinois, have invented certain new and useful Improvements in Tobacco-Presses; and I do hereby declare that the following is a full, clear, and exact description thereof, reference being had to the accompanying drawings, in which—

Figure 1:
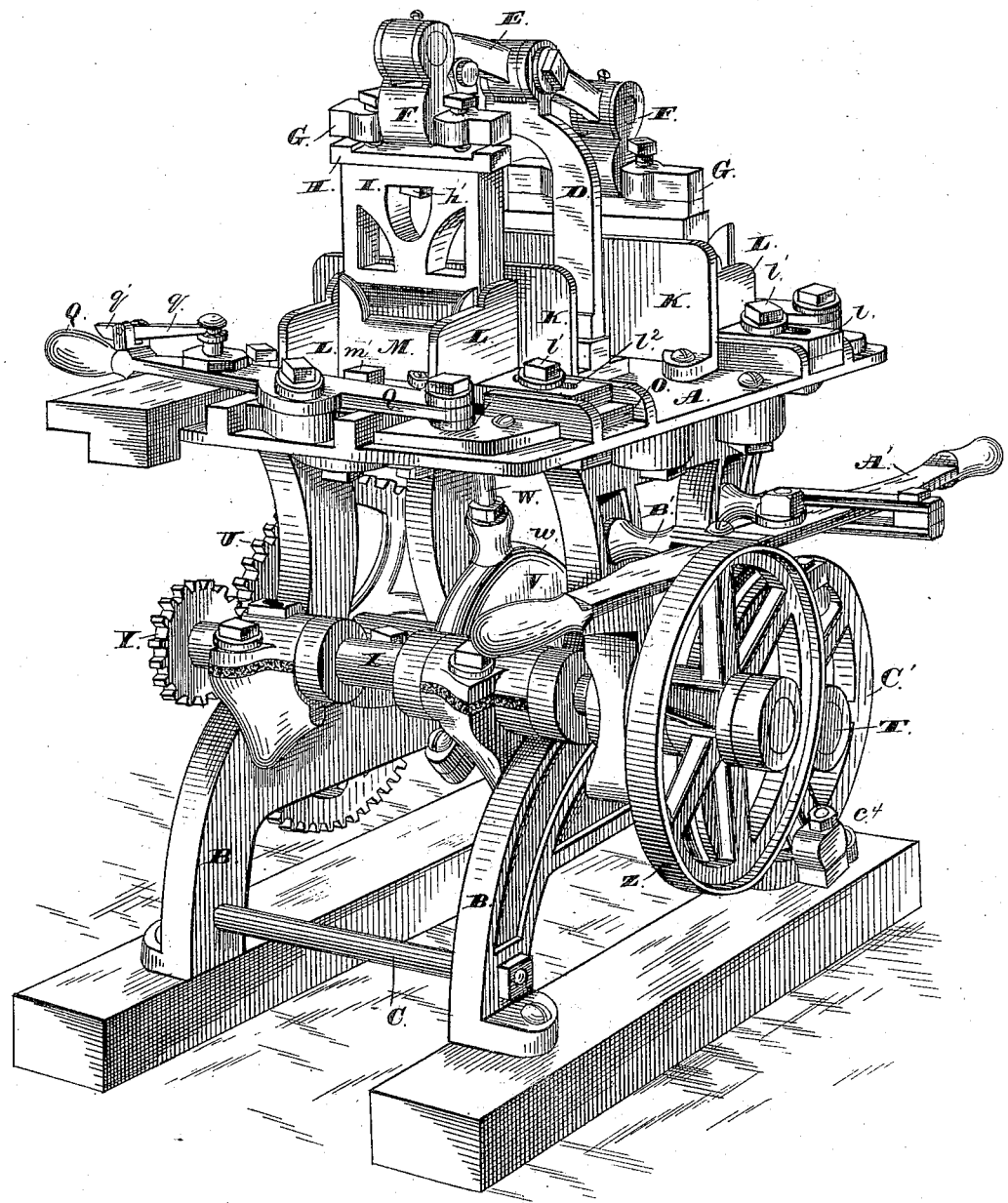
Figure 2:
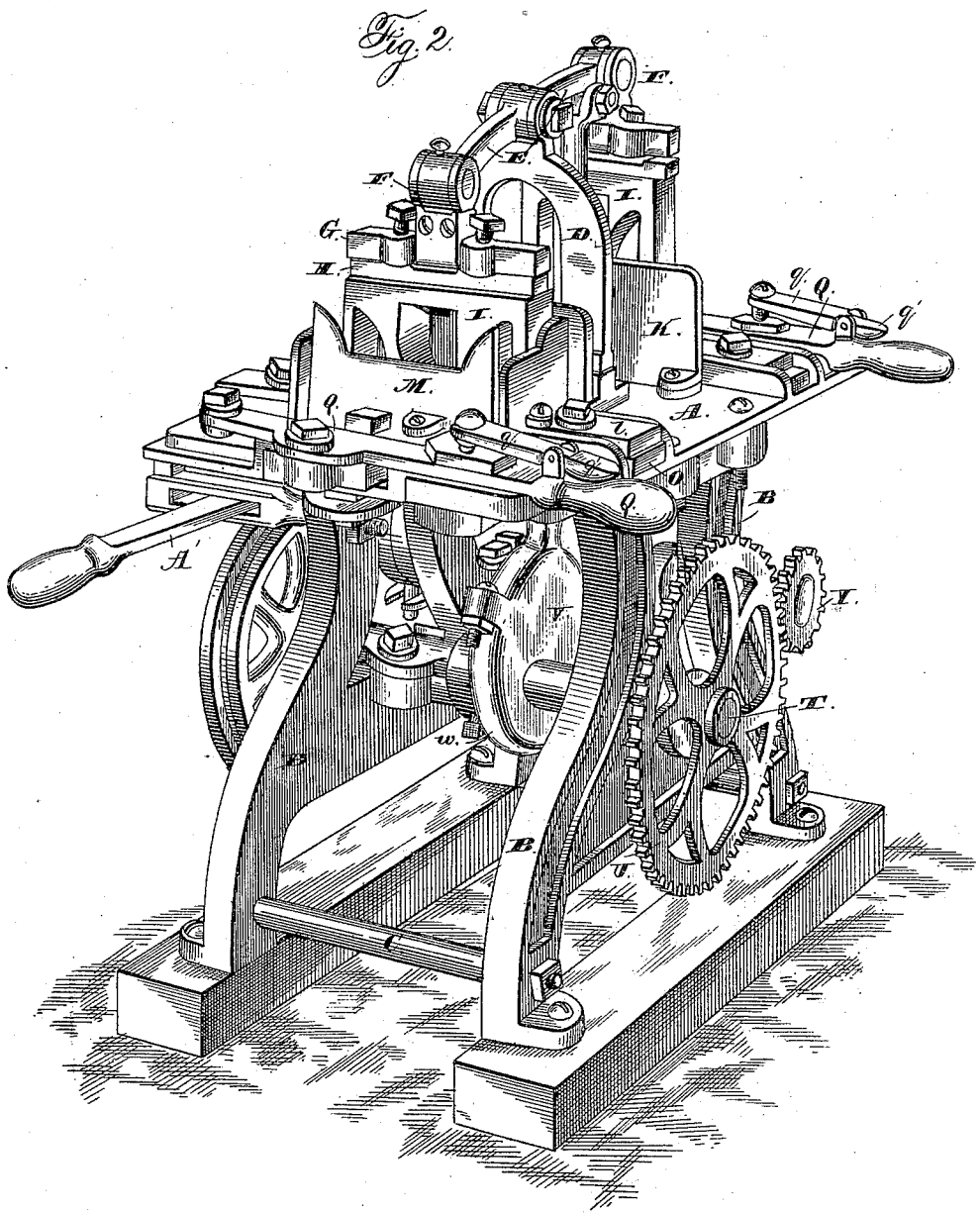
Figure 3:
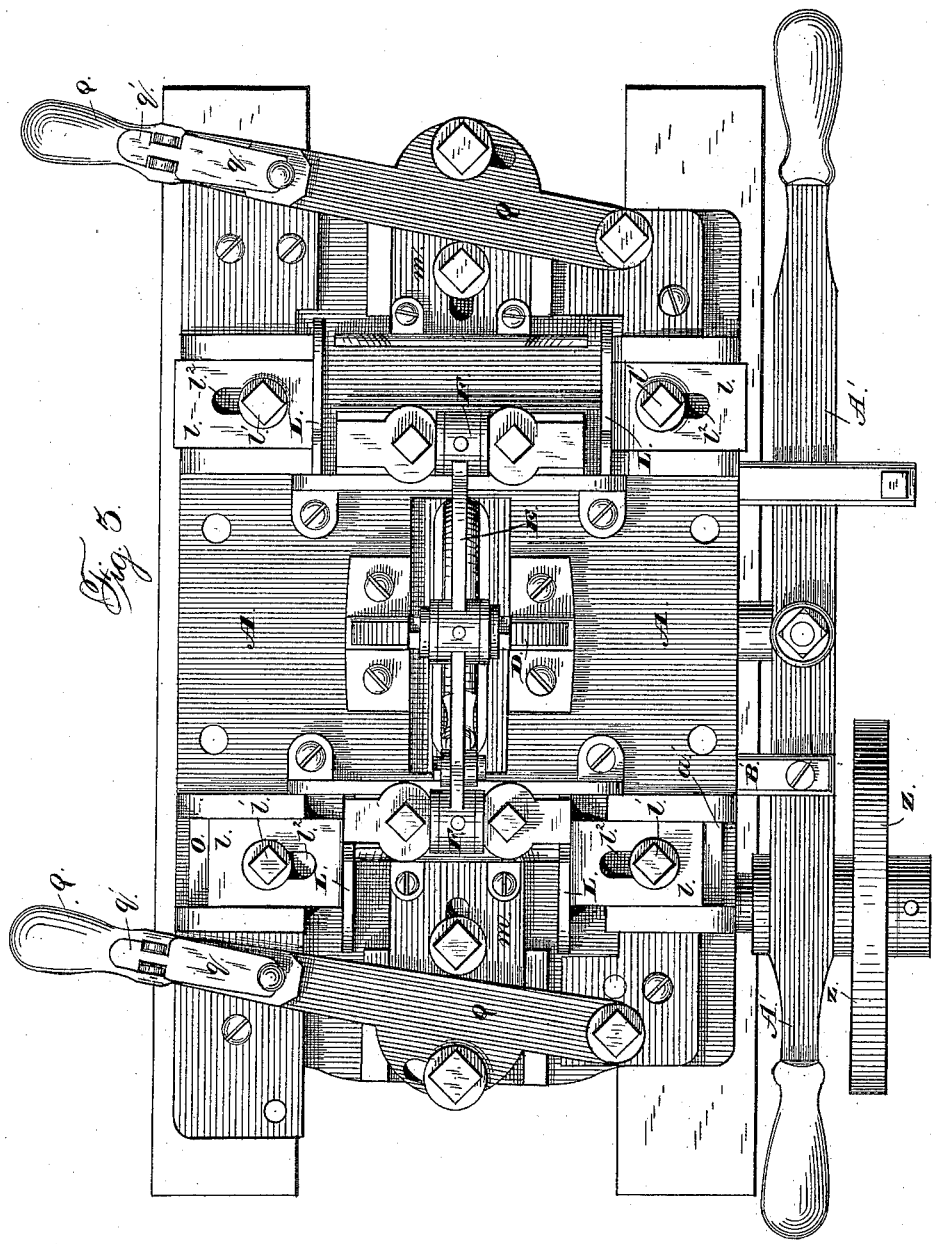
Figure 4:
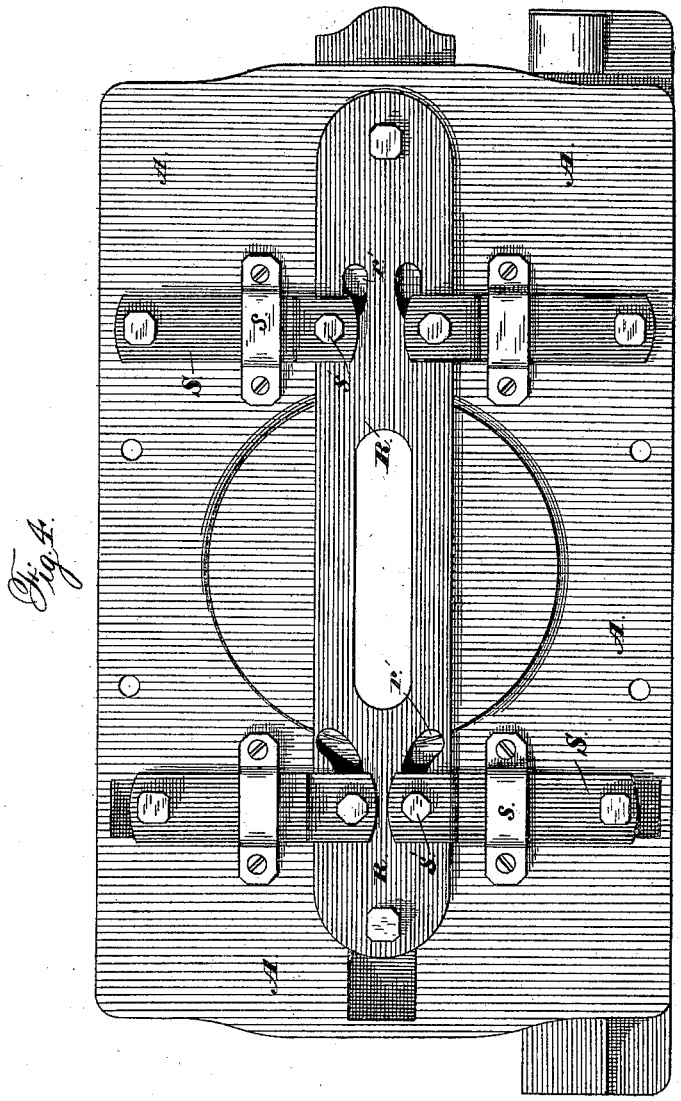
Figure 5:
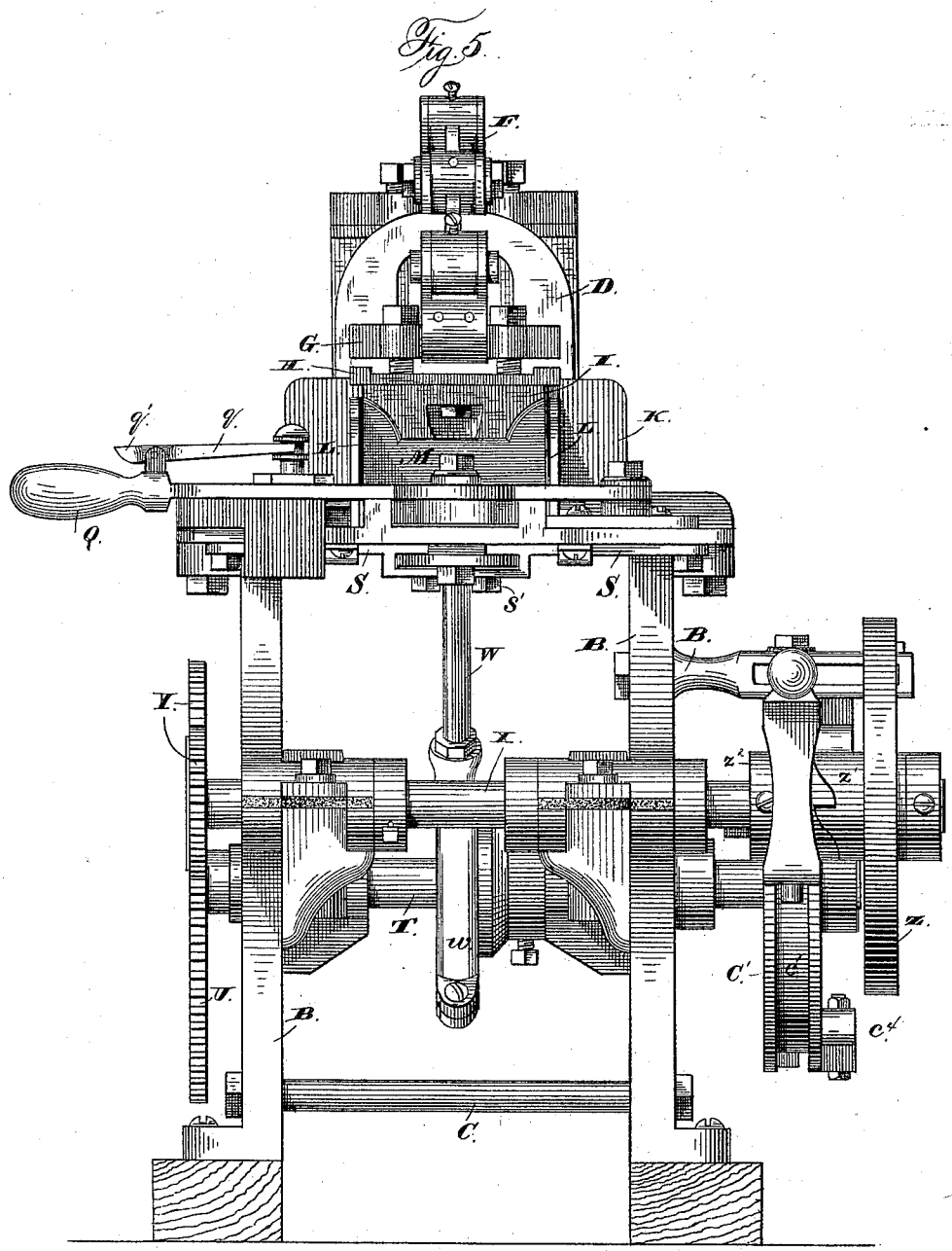
Figure 6:
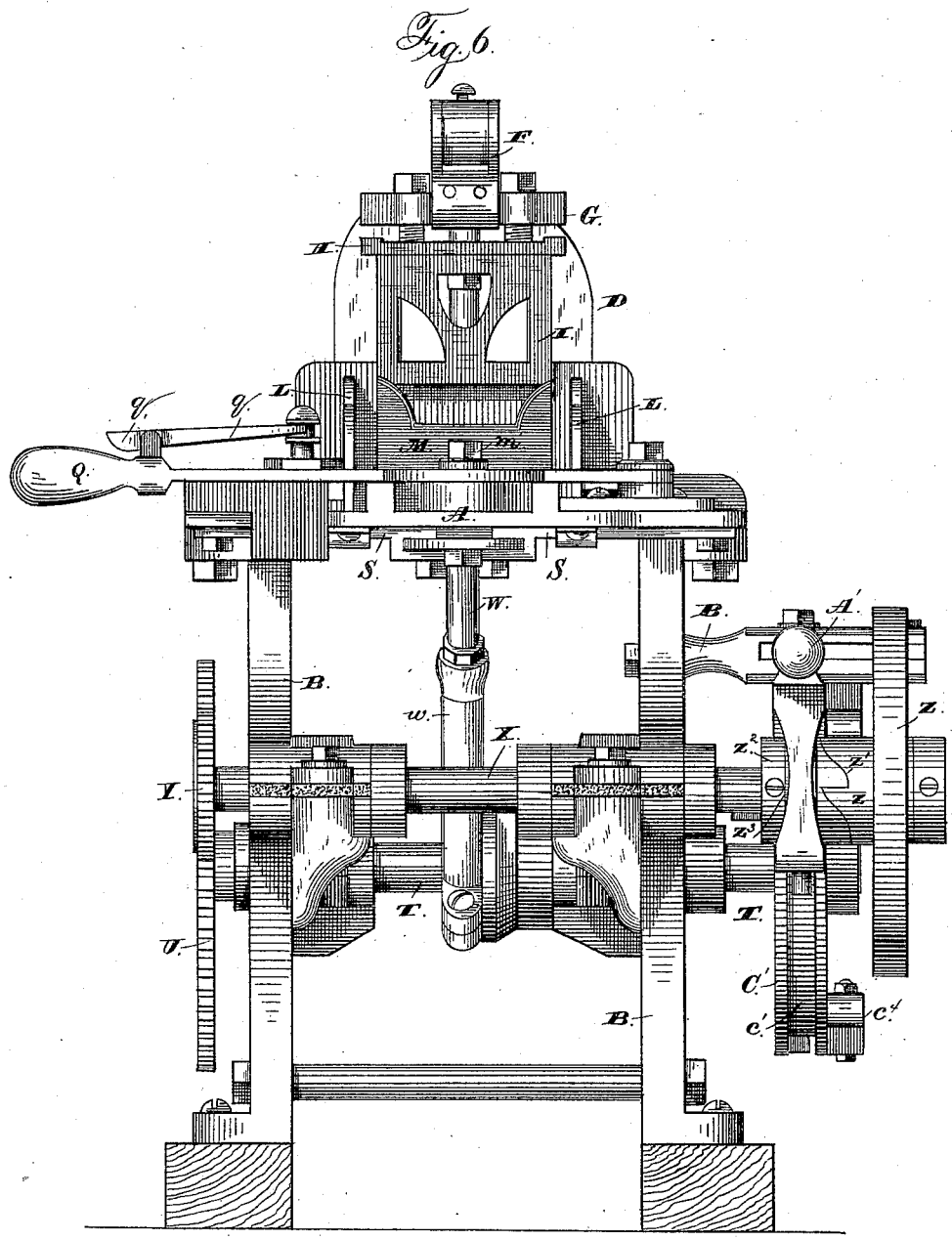
Figure 7:
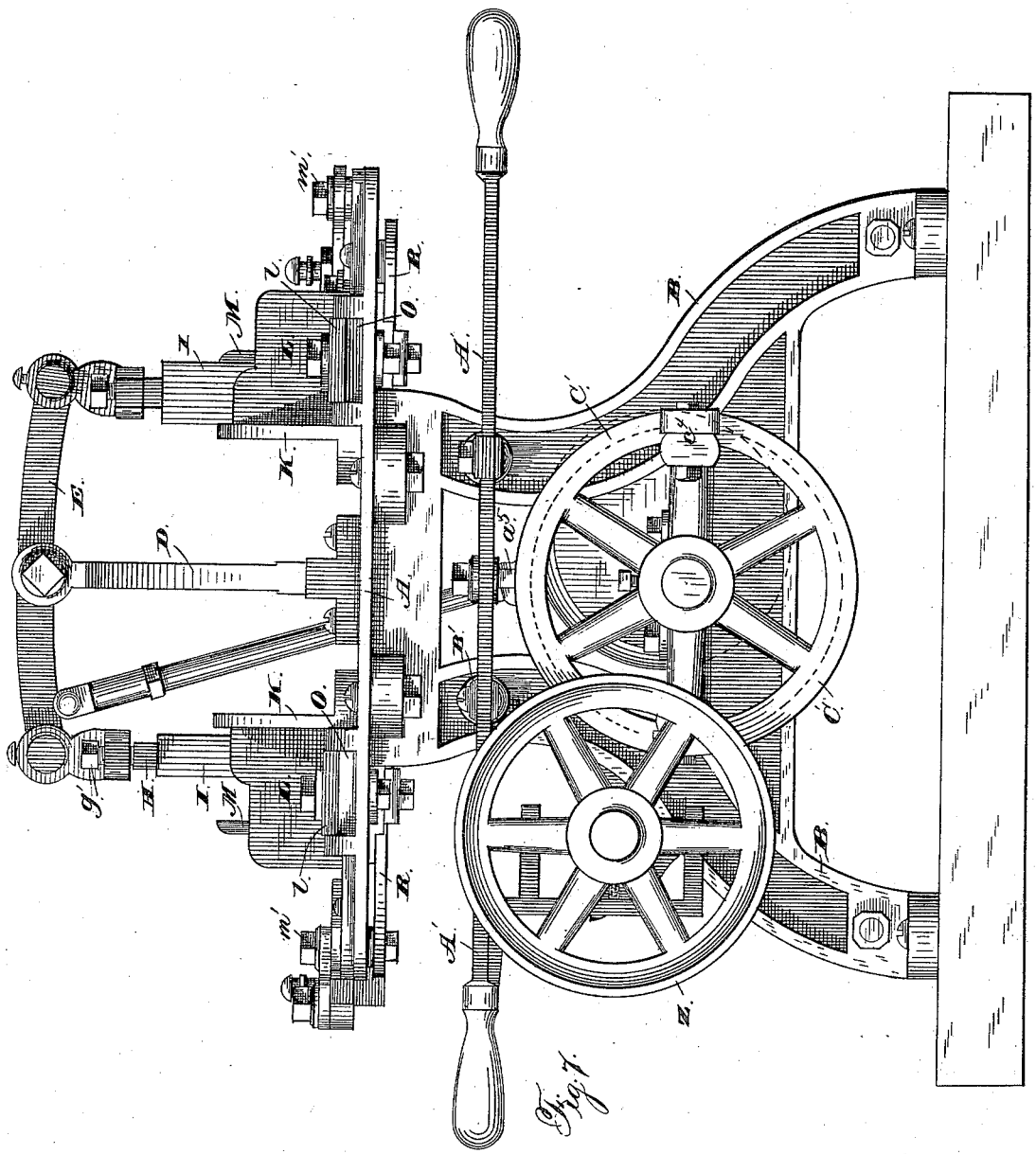
Figure 8:
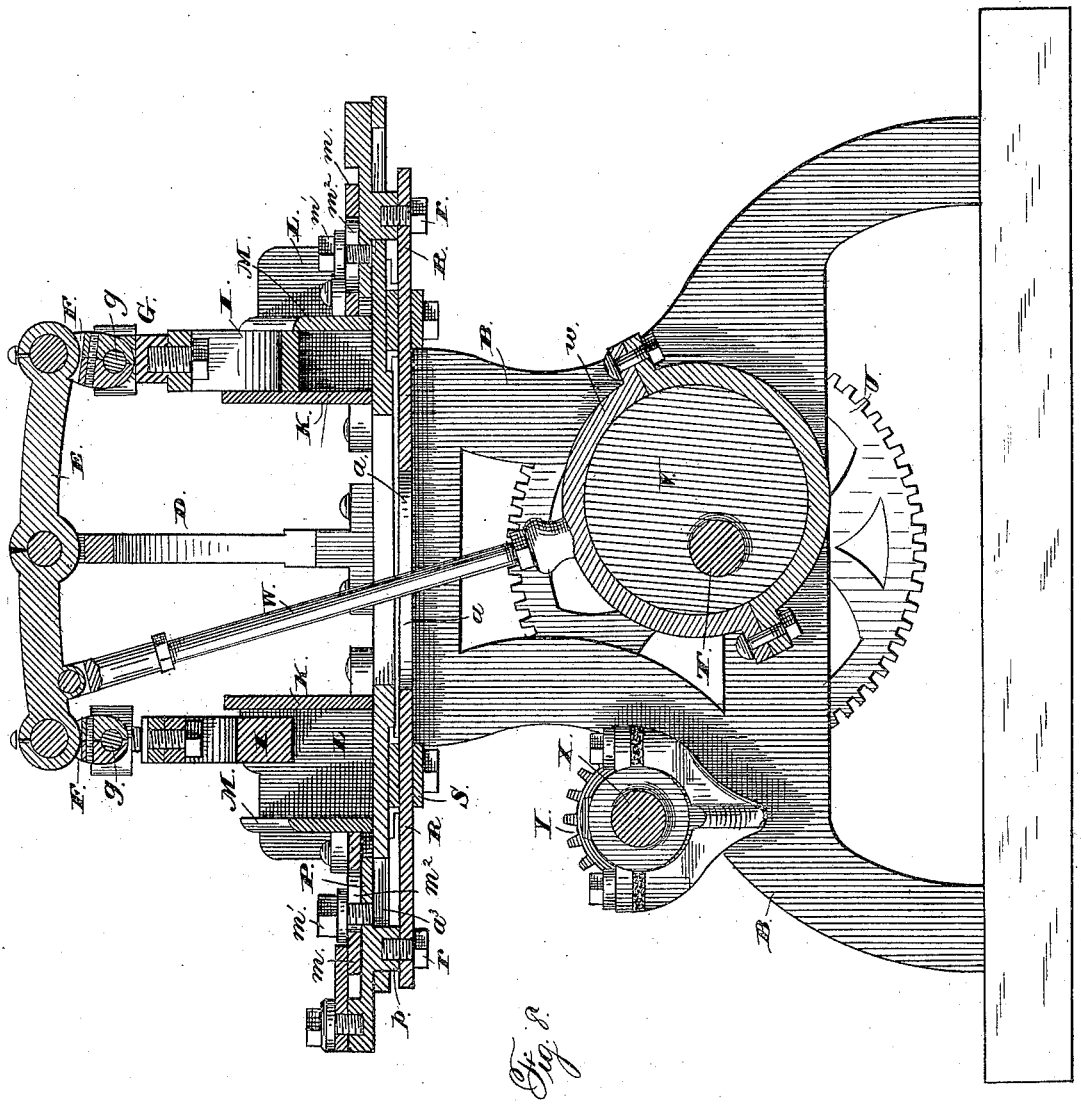

Figure 1 is a perspective view of my machine from the side to which power is applied. Fig. 2 is a like view of the same from the opposite side. Fig. 3 is a plan view of said machine from above. Fig. 4 is a like view of the lower face of the table. Fig. 5 is an end elevation of said machine, with the nearest plunger at the lowest point of its motion. Fig. 6 is a like view of the same, showing said plunger at the upper limit of its motion. Fig. 7 is a side elevation of said machine with its operative parts arranged as shown in Fig. 6. Fig. 8 is a section upon line $x\ x$ of Fig. 6. Fig. 9 is a perspective view of the parts composing the mold separated from each other. Fig. 10 is a like view of the same united. Fig. 11 is a perspective view of the cam-groove shifting-wheel separated from the machine; and Fig. 12 is a section of the same through the adjustable lug.

Letters of like name and kind refer to like parts in each of the figures.

The design of my invention is to enable lumps for plug-tobacco to be easily, cheaply, and perfectly prepared; to which end said invention consists, principally, as an improvement in tobacco-pressing machines, in a mold composed of a stationary back and bottom and a movable front and ends, which are closed inward by the operation of one lever, substantially as and for the purpose hereinafter specified.

It consists, further, in a tobacco-mold having a stationary bottom and back and a movable front and ends, which ends are first moved inward and said front then closed by the operation of one mechanism, substantially as and for the purpose hereinafter shown.

It consists, further, in a tobacco-pressing machine provided with two sets of compressing devices, which are adapted to be simultaneously operated by one mechanism, so as to alternately receive a charge of tobacco and to compress the same into a lump, substantially as and for the purpose hereinafter set forth.

It consists, further, in a tobacco-press provided with two molds which are each adapted to be opened and closed, in combination with mechanism whereby, when one of said molds is opened, the other is simultaneously closed, substantially as and for the purpose hereinafter shown and described.

It consists, further, in the means employed for operating the movable portions of the mold, substantially as hereinafter specified.

It consists, further, in the construction of the plunger and its combination with the cross-head, substantially as and for the purpose hereinafter shown.

It consists, further, in the means employed for combining the cross-head with the walking-beam, substantially as and for the purpose hereinafter set forth.

It consists, further, in the means employed for operating the plungers, substantially as hereinafter shown and described.

It consists, further, in the means employed for connecting the operating mechanism with and disconnecting the same from the driving-pulley, substantially as and for the purpose hereinafter specified.

It consists, finally, in the tobacco-pressing machine, constructed and adapted to operate in the manner and for the purpose substantially as hereinafter shown.

In the annexed drawings, A represents a table, which has, in plan view, a rectangular form, and is secured to and supported upon two frame sides, B and B, that have the general form shown in Fig. 7, and are connected together at or near their ends by means of rungs C. At the transverse center of the table A is a longitudinal slot or opening, $a$, which has a length equal to about one-third of said table, and is spanned by a frame, D, that has journaled upon its upper end a walking-beam, E, which beam extends lengthwise of said table to points slightly beyond the ends of said opening $a$ and is adapted to be oscillated upon said frame by mechanism hereinafter described, as in case of the walking-beam of an engine.

Journaled upon and depending from each end of the walking-beam E is a link, F, which, at its lower end, is journaled upon the central portion or journal, $g$, of a cross-head, G, and operates to connect the latter with said walking-beam, and to preserve their relative vertical positions, while allowing to said crosshead certain freedom of motion toward or from the frame D.

Directly below the cross-head G, and corresponding therewith in length, is a bar, H, which is connected therewith by means of two screws, $g'$, that pass through correspondingly-threaded openings in the former, and have their lower ends swiveled within said bar, the arrangement being such that by turning said screws in one direction said bar H will be drawn upward toward said cross-head, while by reversing the motion of said screws the former will be moved downward from the latter. From the center, at the lower side of the bar H, a screw, $h$, extends downward through a corresponding opening, $i$, that is formed in the upper end of a block, I, and, by means of a nut, $h'$, which is placed upon the projecting end of said screw within a recess, $i'$, that is provided in said block, operates to confine the latter firmly against the lower face of said bar. Said block has, in horizontal section, the length and width of the lump of tobacco which is to be formed, and, as hereinafter described, operates as a plunger in compressing the same. The adjustment of the bar H enables the said plunger to be moved vertically the necessary distance to enable the exact thickness of lump desired to be made.

Between each end of the opening $a$ in the table A and the adjacent plunger I is a vertical plate, K, which is firmly secured to said table in a line having a right angle to the length of the same, and forms the back of a mold, of which said table forms the bottom, for use in connection with said plunger. The ends of the mold are each formed by means of a vertical plate, L, which is secured upon one end of a block, $l$, that is adapted to slide longitudinally within a corresponding groove, $a'$, which is formed within or upon the upper face of the table A, and has a line parallel with the face of the back plate, K, the arrangement being such as to cause said end plate to occupy a position at a right angle to said back plate, with its rear in contact with the front face of the latter, and to permit of the movement of said end plate toward or from the transverse center of said table, while preserving the angle of the former with relation to the adjacent parts. The front of the mold is formed by means of a vertical plate, M, which corresponds in length to the length of the plunger I, and is caused to maintain a position parallel to the front face of the same by being secured to one end of a block, $m$, that is contained within and adapted to be moved longitudinally through a groove, $a^2$, which is provided within or upon the upper face of the table A, at its end, the arrangement being similar to that by which the end plates, L, are held in position and adapted to be moved toward or from the center of the mold. The end plates and front plate, L and M, respectively, are moved toward or from the plunger I by certain mechanism, hereinafter described, which always moves to the same points in either direction; and, in order that said plates may be adjusted, so as to cause them, when closed inward, to occupy the desired position with relation to said plunger, the blocks $l$ are each mounted upon a similar block, O, and held thereon by means of a screw, $l'$, which passes through a longitudinal slot, $l^2$, into said block O, while the block $m$ is in like manner supported by a block, P, and is secured thereon by means of a screw, $m'$, that passes through a longitudinal slot, $m^2$, in said block $m$, and has its threaded end contained within a correspondingly-threaded opening in said block P. By loosening either of the screws $l'$ or $m'$ the upper one of the blocks secured together thereby may be moved lengthwise the desired distance, and then again secured in place by the tightening of said screw.

The front plate, M, is moved inward or outward by means of a lever, Q, which is pivoted at one end upon one corner of the table A, and, extending horizontally across the outer end of the block P, is pivoted at such point to the same. By moving the free end of said lever inward or outward said front plate, M, will be correspondingly moved. When at the limit of motion in either direction said lever is locked in place by means of a pawl, $q$, which passes through a suitable opening in the same into the table below, and is released from engagement by a lever, $q'$, that is connected with said pawl and is in convenient position to be grasped by the hand of the operator. While the locking device described is preferably employed, any one of the usual forms of locking devices may be used for such purpose.

As the pressing mechanisms at opposite ends of the machine are to be alternately used, the blocks P are connected together by means of a bar, R, which is placed beneath the table A and at each end has a bolt, $r$, passed upward into a lug, $p$, that projects from the lower side of said block downward through a suitable longitudinal slot, $a^3$, in said table, such arrangement causing one of said front plates to be moved outward as the other plate is moved inward, and permitting such operation to be performed by the use of either of the levers.

The end plates, L, are moved inward or outward by means of the following-described mechanism, viz: Each block O is provided with a boss, $o$, which projects from its lower side downward through a transverse slot, $a^4$, that is provided in the table A, and to its lower end has secured one end of a bar, S, that from thence extends through a suitable bearing, $s$, inward to the bar R, and at its inner end is bifurcated so as to cause it to pass under and over the latter. A longitudinally-curved cam-slot, $r'$, provided in said bar R, receives a bolt, $s'$, that passes vertically through the same, and through the ends of said bar S, and connects said parts together, so that a longitudinal movement of said bar R in one direction will cause said bars S to be moved inward, while a relatively-opposite movement of the former will cause the latter to be moved outward. The shapes of the cam-slots $r'$ are such as to cause the ends L to move inward or outward as the front plate, M, of their mold moves in like directions; but in order that the best results may be obtained, it has been found necessary that said end plates should reach the inner limit of their motion in advance of said front plate; and such is accordingly provided for by giving to said cam-slots such shape as to cause them to perform their work before the bar S reaches the limit of its motion.

In use, one of the molds is opened when its plunger is raised to the upper limit of its motion, and is filled with a charge of tobacco, after which said mold is closed and said plunger caused to descend and compress said charge. By arranging the end plates to move inward in advance of the front plate, the leaves composing the lump are compressed endwise before being pressed sidewise, and thereby the ends of said lump are made solid and firm. When one mold has been closed, and while its plunger is descending to compress a charge of tobacco, the opposite mold has been opened and its plunger is rising, and the operative has opportunity to remove from the latter the pressed lump and to substitute therefor a fresh charge of tobacco, so that the filling, pressing, and removing operations may be simultaneously carried on by two persons in the same time, with the same power, and at but a little more expense for mechanism than would be necessary for one operative.

The compressing devices are operated by the following-described mechanism, viz: Journaled within the central portion of the frame B is a shaft, T, which is provided upon one end with a gear-wheel, U, and upon its central portion has an eccentric, V, that carries a peripheral strap, $w$, from which a rod, W, extends to and is pivoted upon the walking-beam E, near one end of the same. A second shaft, X, is journaled upon the ends of said frame sides parallel with said shaft T, and upon one end is provided with a pinion, Y, which meshes with said gear-wheel U, and upon its opposite end has a belt-wheel, Z, that is connected with a motor, the arrangement being such that the revolution of said shaft X will, through the intermediate mechanism described, cause said walking-beam to be oscillated upon its pivotal bearing.

In order that the motion of the compressing mechanism may be automatically arrested whenever either of the plungers reaches the downward limit of its stroke, the following construction is employed: The wheel Z is journaled upon the shaft X, instead of being fastened thereto, and upon the inner face of its hub $z$ is provided with a toothed face, $z'$, which constitutes the fixed half of a clutch, and is engaged, when desired, by a second part, $z^2$, that is adapted to slide lengthwise of said shaft, but is compelled to rotate therewith. A lever, A', pivoted upon a suitable bearing, B', above the shaft X, and adapted to be moved in a horizontal plane, is connected with the movable section $z^2$ of the clutch by means of a strap, $a^5$, which encircles the latter and engages with a peripheral groove in the same, and enables said clutch-section to be moved into engagement with the stationary section $z'$, for which operation either end of said lever may be grasped by the operator. To disengage the clutch at the proper moment, a wheel, C', is secured upon the projecting end of the shaft T, and is provided with a peripheral groove, $c'$, that receives a stud, $a^6$, which projects downward from the lever A'. At two points, corresponding to the upper and lower centers of the eccentric V, said groove has a sharp outward inclination, which operates to move said lever the distance necessary in order to disengage the clutch-sections $z'$ and $z^2$, in consequence of which arrangement the motions of the operative parts of the machine are arrested at the instant that the walking-beam reaches the limit of its motion in either direction, and do not again commence to act until the said lever is moved by hand to cause re-engagement of said clutch-sections.

In order that the shifting or arresting mechanism may be easily adjusted and caused to operate, the periphery of the wheel C', at the points where the outward inclined portions of the groove $c'$ are located, is cut away transversely, and into the groove $c^2$ thus formed is fitted a block, $c^3$, that just fills the same, and is adapted to be readily moved inward or outward and thus secured in place. Within the face of said block is now formed the offset portion $c^4$ of said groove $c'$, and by adjusting the same inward or outward the distance to which the lever A' is moved may be easily and accurately regulated and much time and trouble avoided, which would otherwise be required in effecting such adjustment.

Having thus fully set forth the nature and merits of my invention, what I claim as new is—

1. As an improvement in tobacco-pressing machines, a mold composed of a stationary back and bottom and a movable front and ends which are closed inward by the operation of one lever, substantially as and for the purpose specified.

2. A tobacco-mold having a stationary bottom and back and a movable front and ends, which ends are first moved inward and said front then closed by the operation of one mechanism, substantially as and for the purpose shown.

3. A tobacco-pressing machine provided with two sets of compressing devices, which are adapted to be simultaneously operated in opposite directions by one mechanism, so as to alternately receive a charge of tobacco, and to compress the same into a lump, substantially as and for the purpose set forth.

4. A tobacco-press provided with two molds, which are each adapted to be opened and closed, in combination with mechanism whereby when one of said molds is opened the other is simultaneously closed, substantially as and for the purpose shown and described.

5. In combination with the front plates, M, the bar R, extending between and connected with said plates, and the levers Q, pivoted to the table A and upon said plates or their supporting-blocks, substantially as and for the purpose specified.

6. In combination with the end plates, L, the longitudinal bar R, adapted to be moved longitudinally by means of the levers Q, and provided with the cam-slots $r'$, and the transverse bars S, each connected at one end with one of said plates, and having its opposite end, through the bolt $s$, engaged with one of said cam-slots, substantially as and for the purpose shown.

7. The plunger I, secured to the bar H, and made vertically adjustable with reference to the cross-head G by means of the screws $g'$, substantially as and for the purpose set forth.

8. The combination of the cross-head G, provided with the journal $g$, the link F, and the walking-beam E, substantially as and for the purpose shown and described.

9. In combination with the plungers I, connected with and moved vertically by means of the walking-beam E, the shafts T and X, the gear-wheels U and Y, the belt-wheel Z, the eccentric V, the connecting-rod W, and the strap $w$, all arranged to operate substantially as and for the purpose specified.

10. The combination of the shaft X, the pulley Z, provided with the hub $z$, having a toothed face, $z'$, the clutch-section $z^2$, the lever A′, and the strap $a^5$, substantially as and for the purpose shown.

11. In combination with the shifting-lever A, adapted to operate the clutch-section $z^2$, and provided with the stud $a^6$, the wheel C′, provided with a peripheral cam-groove, $c'$, substantially as and for the purpose set forth.

12. In combination with the wheel C′, provided with the peripheral groove $c'$, the laterally-adjustable blocks $c^3$, fitted within the transverse grooves $c^2$, and provided each with an offset continuation, $c^4$, of said groove $c'$, substantially as and for the purpose shown and described.

13. The hereinbefore-described tobacco-pressing machine, in which the molds adapted to be closed and opened, the plungers, with their actuating mechanism, and the mechanism for starting and automatically arresting the motion of said actuating mechanism, are constructed and combined to operate in the manner and for the purpose substantially as specified.

In testimony that I claim the foregoing I have hereunto set my hand this 7th day of February, 1884.

C. B. ADAMS.

Witnesses:
HENRY C. HAZARD,
FRANK M. GREEN.